(12) United States Patent
Cramblitt

(10) Patent No.: US 11,055,875 B2
(45) Date of Patent: Jul. 6, 2021

(54) COMPUTER-VISION-BASED AUTONOMOUS OR SUPERVISED- AUTONOMOUS LANDING OF AIRCRAFT

(71) Applicant: The Boeing Company, Chicago, IL (US)

(72) Inventor: Robert Merrill Cramblitt, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 16/227,153

(22) Filed: Dec. 20, 2018

(65) Prior Publication Data

US 2020/0202559 A1 Jun. 25, 2020

(51) Int. Cl.
*G06T 7/73* (2017.01)
*G05D 1/00* (2006.01)
*G05D 1/10* (2006.01)
*G06K 9/00* (2006.01)
*G06K 9/62* (2006.01)

(52) U.S. Cl.
CPC .............. *G06T 7/74* (2017.01); *G05D 1/0088* (2013.01); *G05D 1/101* (2013.01); *G06K 9/0063* (2013.01); *G06K 9/6215* (2013.01); *G06T 2207/10032* (2013.01); *G06T 2207/30252* (2013.01)

(58) Field of Classification Search
CPC .............. G06T 7/74; G06T 2207/10032; G06T 2207/30252; G06T 2207/10016; G06T 7/70; G06T 7/00; G05D 1/0088; G05D 1/101; G05D 1/0676; G06K 9/0063; G06K 9/6215; G06K 9/00664; G01C 21/005
See application file for complete search history.

(56) References Cited

U.S. PATENT DOCUMENTS 5,809,171 A 9/1998 Neff et al.
5,890,808 A 4/1999 Neff et al.
(Continued)

OTHER PUBLICATIONS

William J. Hughes Technical Center Waas T&E Team, "Global Positioning System (GPS) Standard Positioning Service (SPS) Performance Analysis Report," Federal Aviation Administration, Washington, Jan. 31, 2017.
(Continued)

*Primary Examiner* — Marthe Y Marc-Coleman
(74) *Attorney, Agent, or Firm* — Womble Bond Dickinson (US) LLP

(57) ABSTRACT

An apparatus for supporting an aircraft approaching an airfield runway of an airfield is provided. The apparatus obtains a current pose estimate of the aircraft relative to the airfield runway and determines, based on the current pose estimate of the aircraft, a plurality of proximate poses of the aircraft. The apparatus generates a plurality of images of the airfield runway from a plurality of expected points-of-view of the aircraft and acquires a real-time image of the airfield runway. The apparatus performs a comparison of the real-time image and the plurality of images to identify a best-match image from the plurality of images and generates, based on the best-match image, an updated current pose estimate of the aircraft. The apparatus outputs the updated current pose estimate to a flight control computer of the aircraft, for use in guidance of the aircraft on a final approach.

24 Claims, 7 Drawing Sheets

(56) References Cited

U.S. PATENT DOCUMENTS

| | | | |
|---|---|---|---|
| 5,946,422 A | | 8/1999 | Neff et al. |
| 5,982,930 A | | 11/1999 | Neff et al. |
| 5,982,945 A | | 11/1999 | Neff et al. |
| 6,980,892 B1 | * | 12/2005 | Chen .................... G01C 21/005 340/970 |
| 8,332,083 B1 | * | 12/2012 | McCusker ........... G05D 1/0676 701/4 |
| 2016/0139603 A1 | * | 5/2016 | Bianchi ................. B64C 39/024 701/4 |

OTHER PUBLICATIONS

Federal Aviation Administration, "Satellite Navigation—Ground Based Augmentation System (GBAS)," [Online]. Available:https://www.faa.gov/about/office_org/headquarters_offices/ato/service_unitstechops/navservices/gnss/laas/. [Accessed Jun. 27, 2018].

Tiago F. Goncalves, Joel R. Azinheira, Patrick Rives, "Vision-Based Automatic Approach and Landing of Fized-Wing Aircraft Using a Dense Visual Tracking," in Informatics in Control Automation and Robotics, vol. LNEE 85, e. a. J. A. Cello, Ed., Heidelberg, Springer-Varlag, 2011, pp. 269-282.

Extended European Search Report from related European Patent Appl. No. 19208279.0; dated May 12, 2020.

Chatterji et al., "Vision-Based Position and Attitude Determination for Aircraft Night Landing," Journal of Guidance, Control, and Dynamics, vol. 21, No. 1, Jan.-Feb. 1998, pp. 84-92.

Soni et al., "Modelling Issues in Vision Based Aircraft Navigation During Landing," Proceedings of the 2nd IEEE Workshop on Applications of Computer Vision, Dec. 5, 1994, pp. 89-96.

* cited by examiner

COMPUTER-VISION-BASED AUTONOMOUS OR SUPERVISED- AUTONOMOUS LANDING OF AIRCRAFT

TECHNOLOGICAL FIELD

The present disclosure relates generally to aircraft operations, and in particular, to computer-vision-based autonomous or supervised-autonomous landing of aircraft.

BACKGROUND

Some existing systems and sensors can allow aircraft to navigate autonomously between one location and another location. However, these existing systems and sensors may not provide a final position and attitude determination with sufficient accuracy and precision to support precise landing of the aircraft. For example, global navigation satellite systems (GNSSs) such as the Global Positioning System (GPS) can provide reasonably accurate position information. These systems typically do not provide attitude information (e.g., yaw, pitch and roll), their accuracy can vary, and their signals may be at times unavailable and subject to multipath reflections.

Inertial navigation systems (INSs) also aid aircraft navigation. But these systems often accumulate position errors over time, which may be unacceptable for precisely determining an aircraft's position with respect to a runway of an airfield. Automatic landing systems (ALSs) allow for supervised automated landing with various minimum visibility requirements, but these systems are often only installed on large aircraft due to cost and weight considerations.

Instrument landing systems (ILSs) can assist a pilot or autopilot to determine the bearing and glideslope to a runway, but ILSs require a visual check by the pilot (e.g., the pilot may call a missed approach). The ground-based augmentation System (GBAS) can provide differential corrections and integrity monitoring of GNSSs to allow precise landing. But GBAS is only available at facilities that have purchased and installed the system.

Therefore, it would be desirable to have a system and method that takes into account at least some of the issues discussed above, as well as other possible issues.

BRIEF SUMMARY

Example implementations of the present disclosure are directed to computer-vision-based autonomous or supervised-autonomous landing of aircraft. Example implementations can utilize a vision system including one or more cameras that capture an image of an airport runway from the approaching aircraft. Example implementations can also use computer vision to generate a refined relative aircraft position to facilitate final approach and landing. The refined relative aircraft position can be sufficiently accurate to allow a successful landing of the aircraft.

Example implementations can provide multiple advantages over existing solutions. For example, example implementations can provide computer-vision-based guidance and alignment using any imaging sensor with sufficient resolution. Example implementations can also provide a solution to check or validate other automated system outputs. Further, example implementations can support missed approach decisions on shorter timescales than a human-in-the-loop. Additionally, example implementations are insensitive to issues that degrade radio frequency (RF) systems, such as multipath reflections. Moreover, example implementations can operate independently of any other infrastructure with the use of a terrain database.

The present disclosure thus includes, without limitation, the following example implementations.

Some example implementations provide a method for supporting an aircraft approaching an airfield runway of an airfield, comprising: obtaining a current pose estimate of the aircraft relative to the airfield runway, the current pose estimate having a current altitude, bearing, and distance from the airfield runway; determining, based on the current pose estimate of the aircraft, a plurality of proximate poses of the aircraft each having an adjusted altitude, adjusted bearing, and adjusted distance within a predetermined amount of the current altitude, bearing, and distance from the airfield runway; generating, from airfield model data for the airfield, a plurality of images of the airfield runway from a plurality of expected points-of-view of the aircraft corresponding to the plurality of proximate poses; acquiring, from an imaging device on the aircraft approaching the airfield runway, a real-time image of the airfield runway; performing a comparison of the real-time image and the plurality of images to identify a best-match image from the plurality of images, based on a measure of mutual objects identified in the real-time image and the plurality of images, the best-match image being from a respective one of the plurality of expected points-of-view corresponding to a respective one of the plurality of proximate poses of the aircraft, the respective one of the plurality of proximate poses having a respective adjusted altitude, adjusted bearing, and adjusted distance from the airfield runway; generating, based on the best-match image and the respective adjusted altitude, adjusted bearing, and adjusted distance from the airfield runway, an updated current pose estimate of the aircraft having the respective adjusted altitude, adjusted bearing, and adjusted distance to the airfield runway; and outputting the updated current pose estimate to a flight control computer of the aircraft, for use in guidance of the aircraft on a final approach.

In some example implementations of the method of any preceding example implementation, or any combination of preceding example implementations, obtaining the current pose estimate comprises: determining, via aircraft system data, an initial pose estimate of the aircraft relative to the airfield runway; and setting the initial pose estimate as the current pose estimate.

In some example implementations of the method of any preceding example implementation, or any combination of preceding example implementations, the updated current pose estimate is output to the flight control computer of the aircraft, for use in guidance of the aircraft on the final approach without using instrument landing system navigation data associated with the airfield.

In some example implementations of the method of any preceding example implementation, or any combination of preceding example implementations, the plurality of proximate poses includes a number of proximate poses, and determining the plurality of proximate poses includes reducing the number of proximate poses determined as the current distance from the airfield runway decreases.

In some example implementations of the method of any preceding example implementation, or any combination of preceding example implementations, performing the comparison includes performing the comparison of the real-time image and the plurality of images to identify one or more sections of the best-match image that include the mutual objects identified in the real-time image and the plurality of images.

In some example implementations of the method of any preceding example implementation, or any combination of preceding example implementations, performing the comparison includes determining a correlation between the real-time image and the plurality of images as the measure of mutual objects identified in the real-time image and the plurality of images.

In some example implementations of the method of any preceding example implementation, or any combination of preceding example implementations, the correlation between the real-time image and the best-match image indicates a level of similarity between the real-time image and the best-match image, and the method further comprises producing an indicator indicating the level of similarity to a user.

In some example implementations of the method of any preceding example implementation, or any combination of preceding example implementations, the method further comprises validating instructions of an automatic landing system of the aircraft for the final approach using the updated current pose estimate.

Some example implementations provide an apparatus for supporting an aircraft approaching an airfield runway of an airfield. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for supporting an aircraft approaching an airfield runway of an airfield. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIG. 1 illustrates a system for supporting an aircraft approaching an airfield runway of an airfield, according to example implementations of the present disclosure;

FIGS. 2A, 2B and 2C respectively illustrate a real-time image of the airfield runway and two generated images of the airfield runway, according to example implementations of the present disclosure;

DETAILED DESCRIPTION

Figure 1:
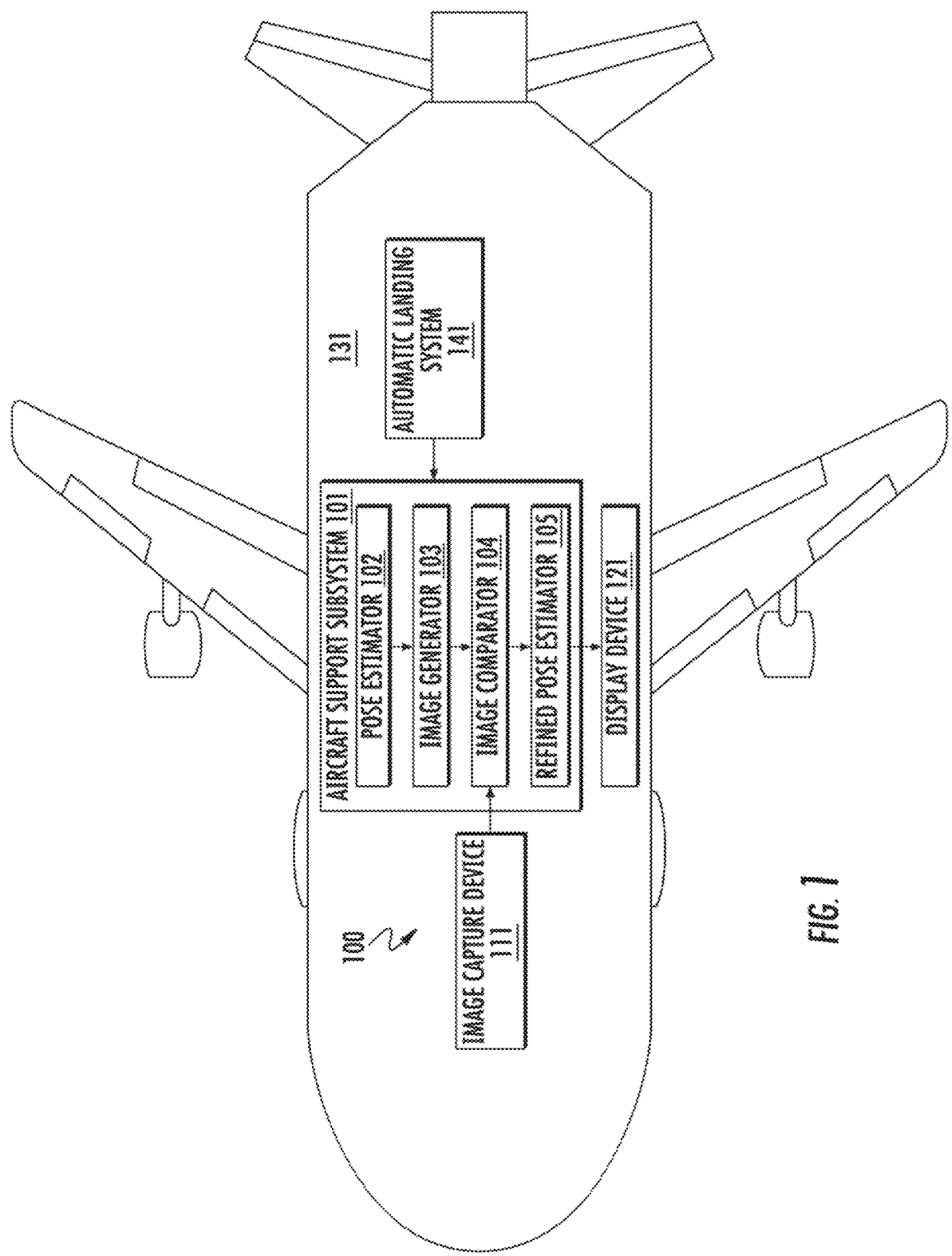

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to aircraft operations, and in particular, to computer-vision-based autonomous or supervised-autonomous landing of aircraft.

FIG. 1 illustrates a system 100 for supporting an aircraft approaching an airfield runway of an airfield, according to example implementations of the present disclosure. In some examples, as described in greater detail with reference to FIG. 6, the system may be implemented by an apparatus for supporting an aircraft approaching an airfield runway of an airfield. Example implementations will be primarily described in the context of supporting an aircraft approaching an airfield runway of an airfield. It should be understood that the system is applicable to any of a number of types of vehicles such as any of a number of different types of manned or unmanned land vehicles, aircraft, spacecraft, watercraft or the like. For example, the system can be used for automatic docking for various types of vehicles mentioned above.

The system 100 includes any of a number of different subsystems (each an individual system) for performing one or more functions or operations. As shown, in some examples, the system includes one or more of each of an aircraft support subsystem 101, an image capture device 111 and a display device 121. As also shown, the aircraft support subsystem may include a pose estimator 102, an image generator 103, an image comparator 104, and a refined pose estimator 105. The aircraft support subsystem, image capture device and display device may be co-located or directly coupled to one another, or in some examples, various ones of the subsystems may communicate with one another across one or more computer networks. Further, although shown as part of the system, it should be understood that any one or more of the pose estimator, image generator, image comparator and refined pose estimator may function or operate as a separate system without regard to any of the other subsystems. It should also be understood that the system may include one or more additional or alternative subsystems than those shown in FIG. 1. The system may be onboard the aircraft 131 and can generate a refined pose for the aircraft when the aircraft is in flight and approaching the airfield runway.

In some examples, the pose estimator 102 is configured to obtain a current pose estimate of the aircraft 131 relative to the airfield runway. The current pose estimate of the aircraft has a current altitude, bearing, and distance from the airfield runway. In some examples, the pose estimator is configured to determine, via aircraft system data, an initial pose estimate of the aircraft relative to the airfield runway. The pose estimator is also configured to set the initial pose estimate as the current pose estimate. For example, the pose estimator can utilize navigation data from a satellite navigation system receiver, such as a Global Positioning System (GPS) receiver, on the aircraft as the initial pose estimate of the aircraft.

After the current pose estimate of the aircraft 131 is obtained, in some examples, the pose estimator 102 is configured to determine, based on the current pose estimate of the aircraft, a plurality of proximate poses of the aircraft. Each of the plurality of proximate poses has an adjusted altitude, adjusted bearing, and adjusted distance within a predetermined amount of the current altitude, bearing, and distance from the airfield runway. The predetermined amount can be a predetermined distance or range, and the proximate poses can be poses proximate to the current pose estimate within the predetermined distance or range.

In some examples, the plurality of proximate poses includes a number of proximate poses. The pose estimator is configured to reduce the number of proximate poses determined as the current distance from the airfield runway decreases. This can reduce the computational demands for the aircraft support subsystem 101. In another example, as the distance to the airfield decreases, the diversity of the proximate poses can be restricted to reduce computational demands.

After the proximate poses are determined, in some examples, the image generator 103 is configured to generate, from airfield model data for the airfield, a plurality of images of the airfield runway from a plurality of expected points-of-view of the aircraft 131 corresponding to the plurality of proximate poses. For example, the image generator can generate one or more images for each of the plurality of expected points-of-view of the aircraft. Each of the expected points-of-view may correspond to a respective proximate pose. In one example, the image generator can generate images of the airfield runway from arbitrary expected points-of-view of the aircraft, which could be determined using an initial estimate of the aircraft position based on a sensed altitude of the aircraft, for example. In another example, the generated images can only capture the extent of the airfield in the scene to reduce computational demands.

In some examples, the image capture device 111 on the aircraft 131 is disposed on a forward portion of the aircraft, such that when the aircraft is approaching the airfield runway the image capture device is configured to acquire a real-time image of the airfield runway. In one example, the aircraft support subsystem 101 may have the information of orientation and position of the image capture device with respect to a reference location on the airframe of the aircraft. The image capture device may include one or more cameras and/or image sensors. The image capture device can capture multiple real-time images of the airfield runway at different points of time when the aircraft is approaching the airfield runway.

In order to estimate a refined pose for the aircraft 131, in some examples, the image comparator 104 is configured to perform a comparison of the real-time image and the plurality of images to identify a best-match image from the plurality of images. The comparison is based on a measure of mutual objects identified in the real-time image and the plurality of images. The best-match image is from a respective one of the plurality of expected points-of-view corresponding to a respective one of the plurality of proximate poses of the aircraft. The respective one of the plurality of proximate poses has a respective adjusted altitude, adjusted bearing, and adjusted distance from the airfield runway.

When performing the comparison, in some examples, the image comparator 104 is configured to perform the comparison of the real-time image and the plurality of images to identify one or more sections of the best-match image that include the mutual objects identified in the real-time image and the plurality of images. For example, the one or more sections of the best-match image may mainly or only include the airfield or the airfield runway that the aircraft 131 is approaching.

When performing the comparison, in some examples, the image comparator 104 is configured to determine a correlation between the real-time image and the plurality of images. The correlation is used as the measure of mutual objects identified in the real-time image and the plurality of images. For example, the image comparator can determine a full image correlation between the entire content of the real-time image and the plurality of images. In another example, the image comparator can correlate a portion of each of the plurality of images containing the airfield with either the full size of the real-time image or a portion of the real-time image in which the airfield appears. The portion of each of the plurality of images may comprise, for example, a number of buildings or structures that are disposed in close proximity to the airfield in the images, where the image comparator 104 can correlate one or more of the structures in the plurality of images with the structures identified in the real-time image of the airfield runway captured by the image capture device 111 on the aircraft 131.

In some examples, the correlation between the real-time image and the best-match image indicates a level of similarity between the real-time image and the best-match image. The image comparator 104 may determine a level of similarity for each of the plurality of images generated, for example, based on the identification of the number of buildings, structures or other features disposed in close proximity to the airfield in each of the plurality of images (for each of the expected points of view). The image comparator 104 may be configured to determine which image, from one of the plurality of expected points-of-view, is the best match to the real-time image of the airfield captured by the image capture device 111 based on the highest level of similarity and/or number of structures identified in the generated image that correspond to the structures in the real-time image. Similarly, the image comparator 104 may determine a level of similarity for each of the plurality of images generated, for example, based on the comparison of the orientation of a number of buildings, structures or other features disposed in close proximity to the airfield in each of the plurality of images, with respect to the real-time images of the airfield. The image comparator can provide the correlation to the display device 121. The display device is configured to produce an indicator indicating the level of similarity to a user such as a pilot of the aircraft 131. The indicator can be a mark displayed by the display device. In one example, a normalized value of the mutual information between the compared images is produced as the correlation. The value can indicate a better match when the value approaches unity.

After the best-match image is identified, in some examples, the refined pose estimator 105 is configured to generate, based on the best-match image and the respective adjusted altitude, adjusted bearing, and adjusted distance from the airfield runway, an updated current pose estimate of the aircraft 131. The updated current pose estimate has the respective adjusted altitude, adjusted bearing, and adjusted distance to the airfield runway.

After the updated current pose estimate of the aircraft 131 is generated, in some examples, the refined pose estimator 105 is configured to output the updated current pose estimate to a flight control computer of the aircraft, for use in guidance of the aircraft on a final approach. In some examples, the updated current pose estimate is output to the flight control computer of the aircraft, for use in guidance of the aircraft on the final approach without using instrument landing system navigation data associated with the airfield. The updated current pose estimate may be displayed by the display device 121.

In some examples, the refined pose estimator 105 is configured to validate instructions of an automatic landing system (ALS) 141 of the aircraft 131 for the final approach using the updated current pose estimate. For example, the ALS can provide data including instructions to the aircraft support subsystem 101. The aircraft support subsystem can provide an active confirmation of the validity of the data provided by the ALS. The ALS can be validated if the altitude, bearing and distance estimates produced by ALS and the aircraft support subsystem are within an acceptable tolerance or threshold.

Figure 2A:
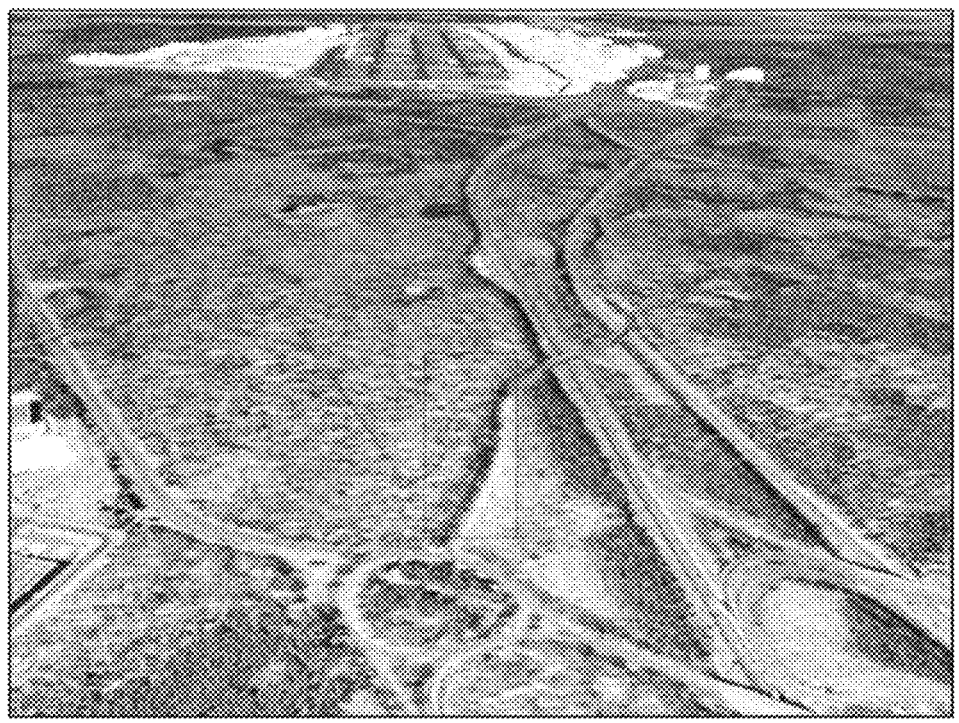
Figure 2B:
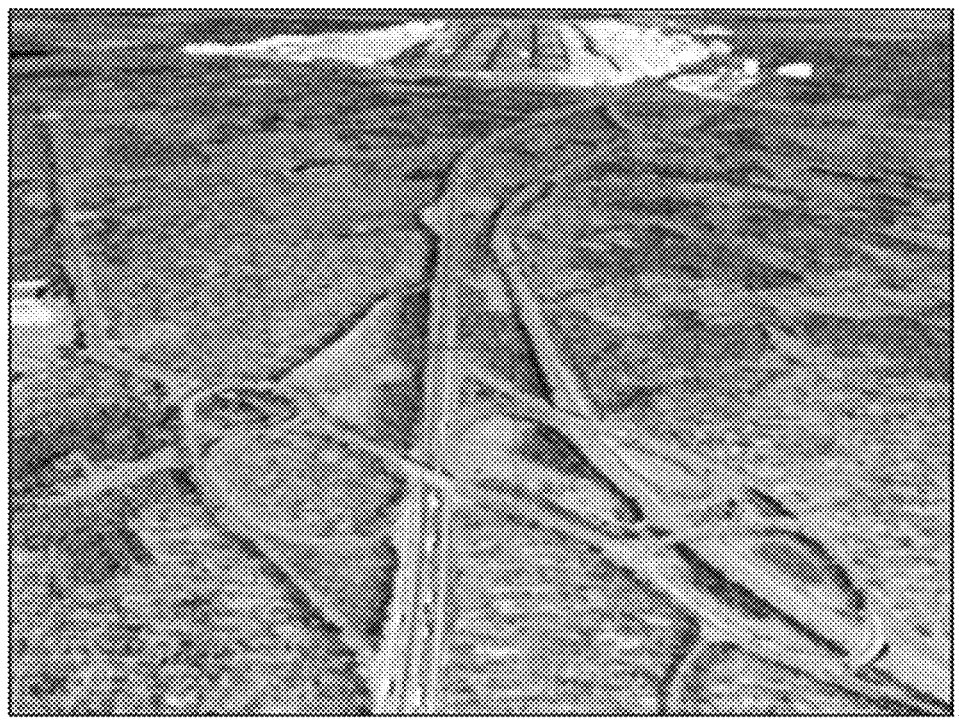
Figure 2C:
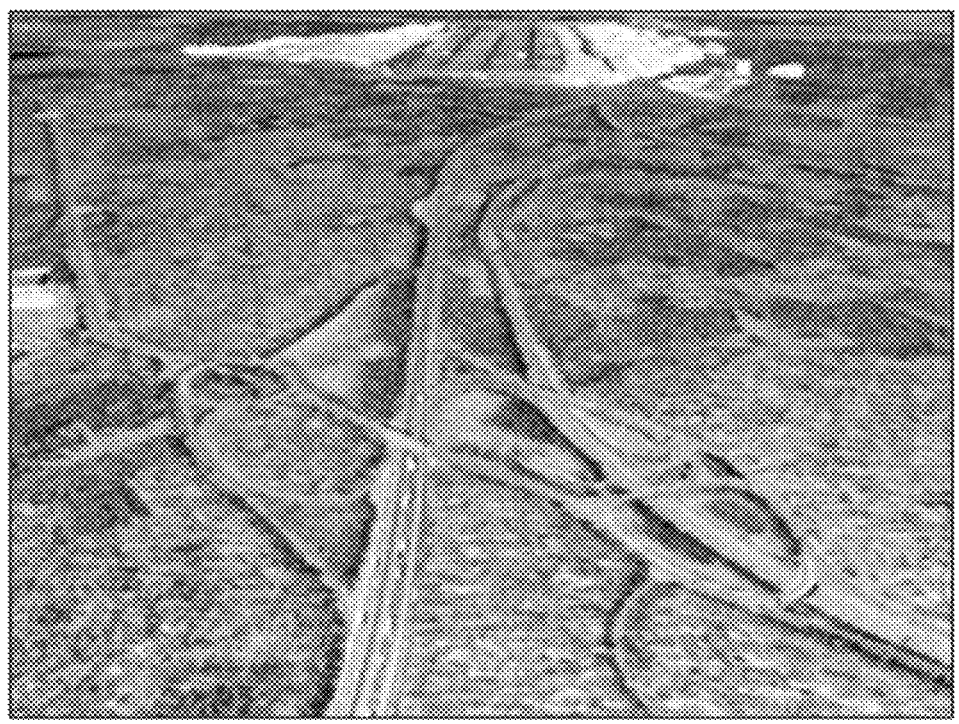

FIGS. 2A, 2B and 2C respectively illustrate a real-time image of the airfield runway and two generated images of the airfield runway, according to example implementations of the present disclosure. As shown, FIG. 2A illustrates a real-time image of a scene of an airfield captured by the imaging device 111 on the aircraft 131 when the aircraft is approaching the airfield runway. FIGS. 2B and 2C respectively illustrate two generated images of the scene of the airfield from two expected points-of-view of the aircraft. The two expected points-of-view may correspond to two proximate poses respectively, as described above.

Figure 3:
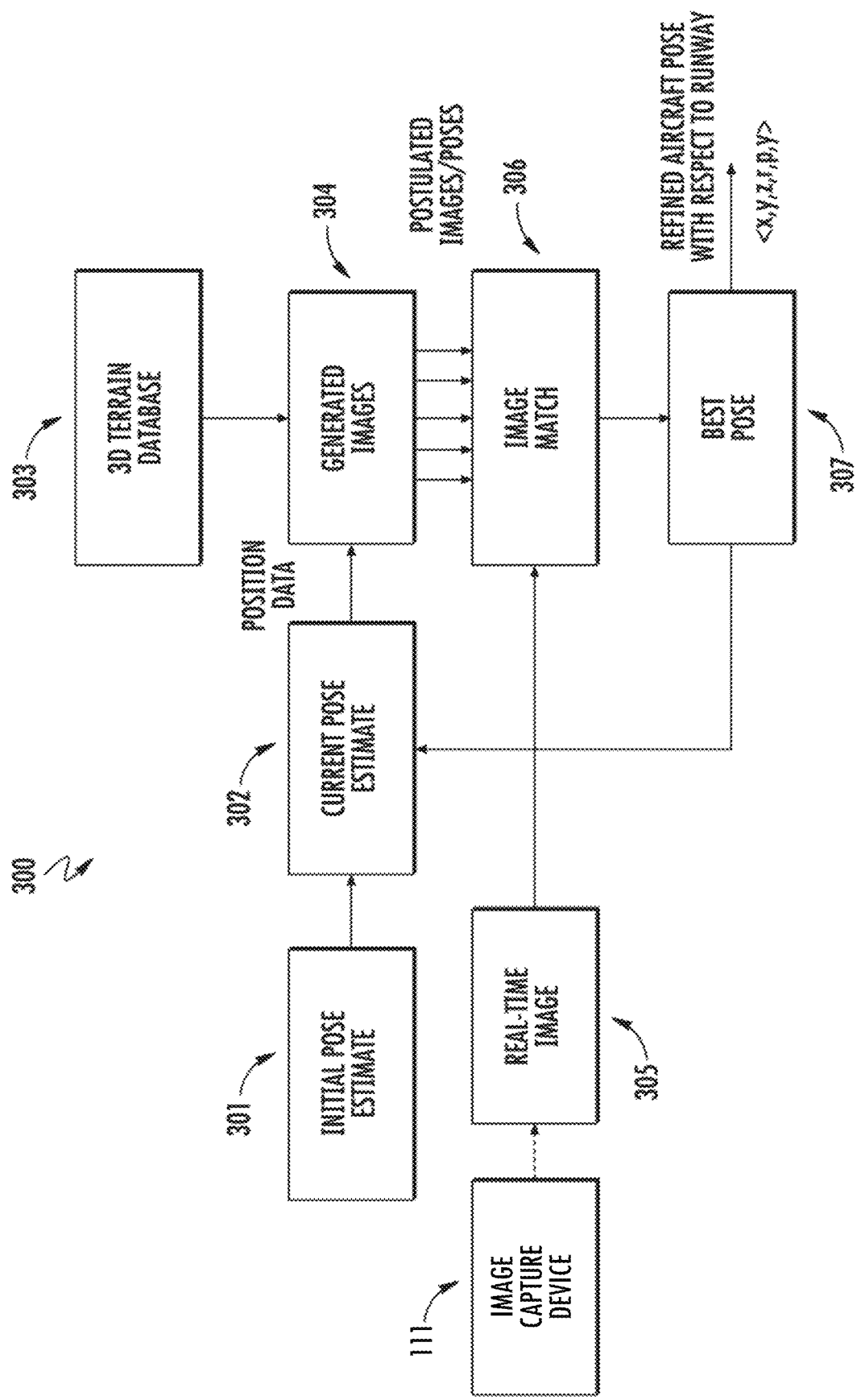
FIG. 3 illustrates a diagram describing the system, according to example implementations of the present disclosure.

FIG. 3 illustrates a diagram 300 describing the system 100, according to example implementations of the present disclosure. As shown, in the method, the pose estimator 102 can determine, via aircraft system data, an initial pose estimate 301 of the aircraft 131 relative to the airfield runway. The pose estimator can set the initial pose estimate as the current pose estimate 302. The position data of the current pose estimate can be provided to the image generator 103. The image generator can use the position data and a 3D terrain database 303 to generate images 304. The 3D terrain database may include buildings and structures in the airfield, terrain elevation and/or features such as runways and light sources. The generated images may be from a plurality of expected points-of-view of the aircraft corresponding to a plurality of proximate poses, as described above.

The image capture device 111 can acquire a real-time image 305 of the airfield runway. At block 306, the image comparator 104 can perform a comparison of the real-time image and the plurality of images to identify a best-match image from the plurality of images. The comparison can be based on a measure of mutual objects identified in the real-time image and the plurality of images such as the airfield runway, as described above. The refined pose estimator 105 can determine the best pose 307 as an updated current pose estimate of the aircraft 131 based on the comparison. The refined pose estimator can also output the updated current pose estimate to a flight control computer of the aircraft, for use in guidance of the aircraft on a final approach. As shown, the updated current pose estimate may be a refined aircraft pose with respect to the airfield runway. The updated current pose estimate includes refined position data of the aircraft relative to the airfield runway such as the 3D coordinates x, y, and z, and also the attitude information such as roll (r), pitch (p) and yaw (y).

Figure 4:
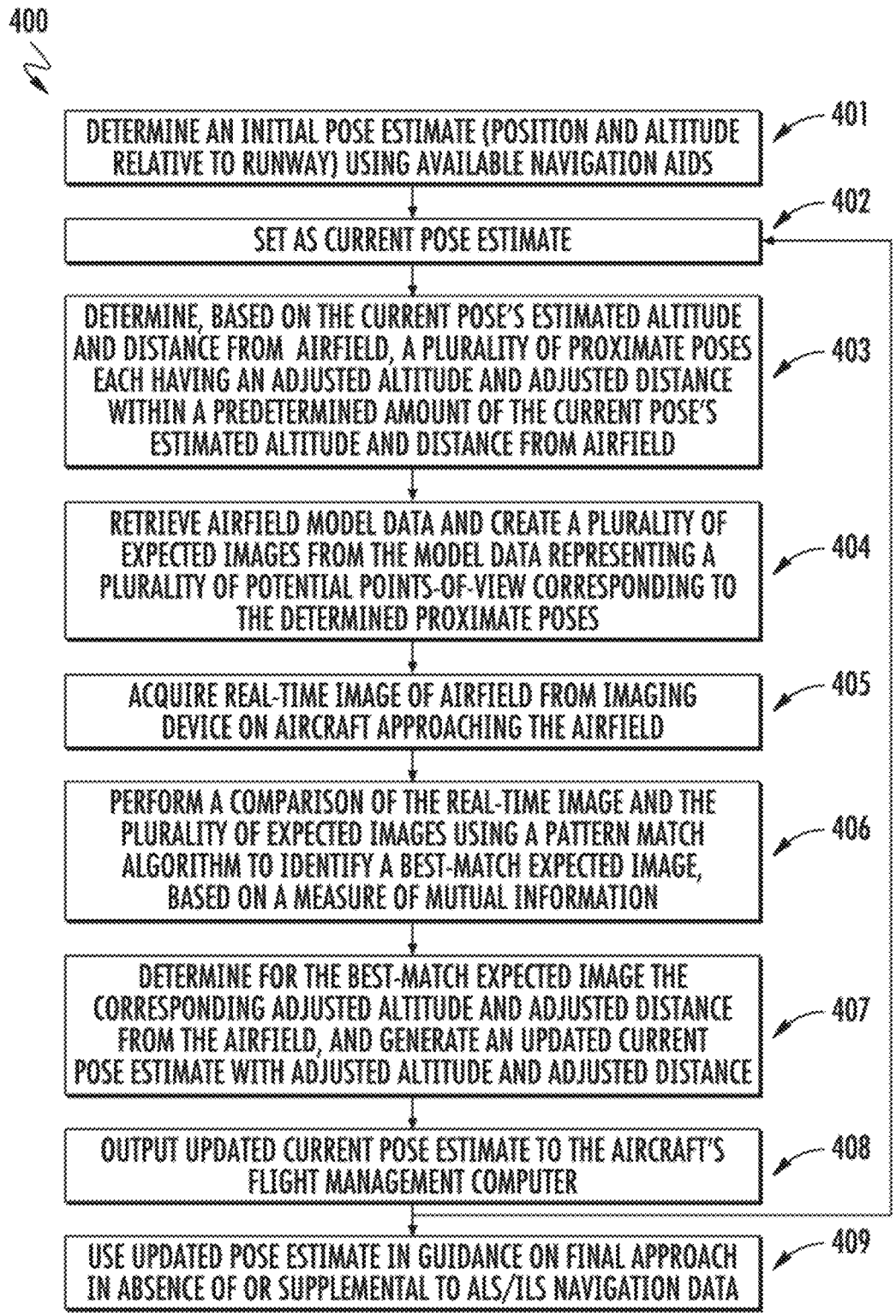
FIGS. 4 and 5 illustrate flowcharts of various operations in methods of supporting an aircraft approaching an airfield runway of an airfield, according to example implementations of the present disclosure.
Figure 5:
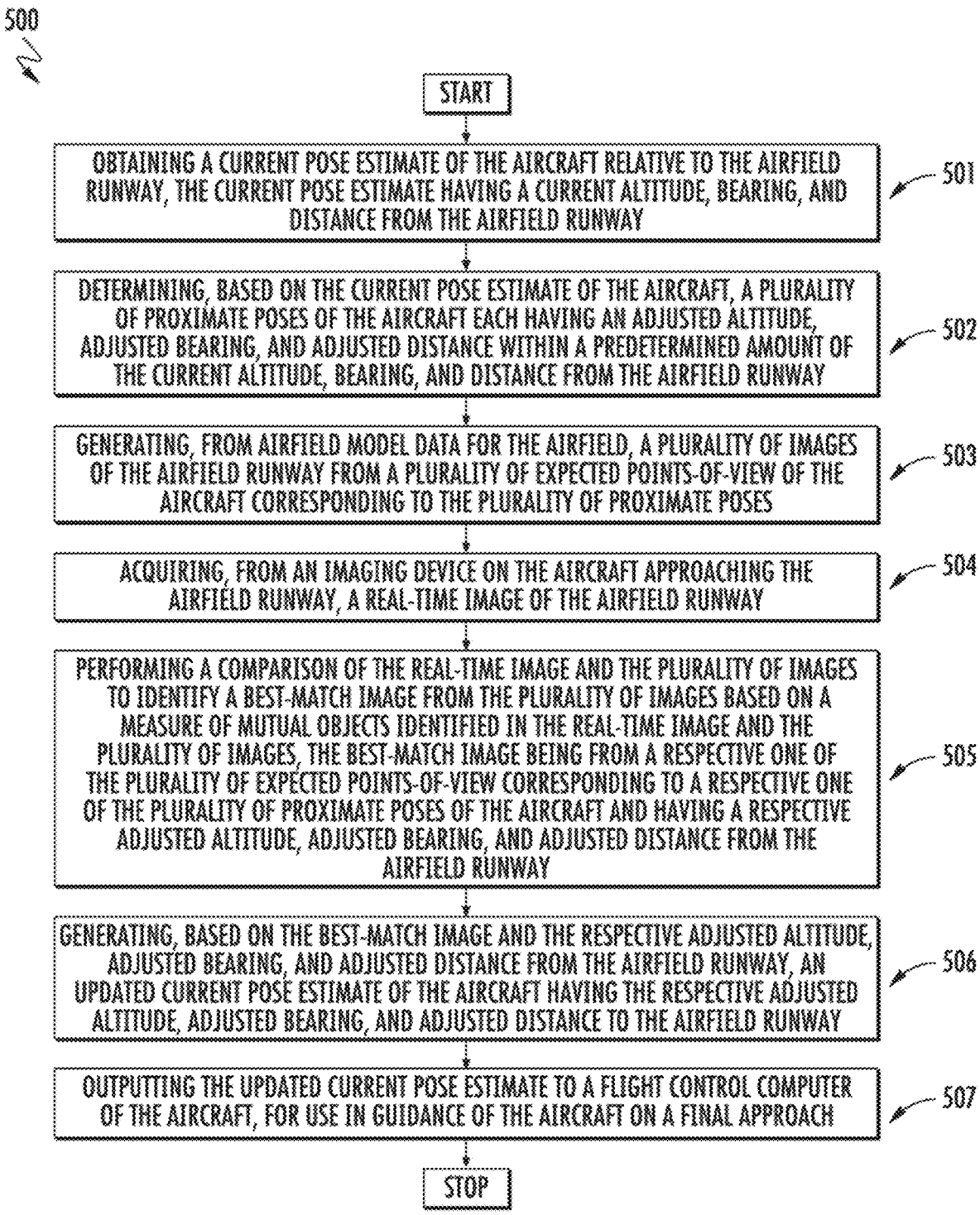

FIGS. 4 and 5 illustrate flowcharts of various operations in methods 400, 500 of supporting the aircraft 131 approaching an airfield runway of an airfield, according to example implementations of the present disclosure. In FIG. 4, at block 401 of the method 400, the pose estimator 102 can determine an initial pose estimate of the aircraft relative to the airfield runway using available navigation aids. At block 402, the pose estimator can set the initial pose estimate as the current pose estimate. At block 403, the pose estimator can determine, based on the current pose's estimated altitude and distance from the airfield, a plurality of proximate poses. Each of the plurality of proximate poses has an adjusted altitude and adjusted distance within a predetermined amount of the current pose's estimated altitude and distance from the airfield.

At block 404, the image generator 103 can retrieve airfield model data and create a plurality of expected images from the model data representing a plurality of potential points-of-view. The plurality of expected images may correspond to the determined proximate poses. At block 405, the image capture device 111 on the aircraft 131 approaching the airfield can acquire a real-time image of the airfield. At block 406, the image comparator 104 can perform a comparison of the real-time image and the plurality of expected images using a pattern match algorithm to identify a best-match exacted image. The comparison can be based on a measure of mutual information.

At block 407, the refined pose estimator 105 can determine the corresponding adjusted altitude and adjusted distance from the airfield for the best-match expected image. The refined pose estimator can also generate an updated current pose estimate with the adjusted altitude and adjusted distance. At block 408, the refined pose estimator can output the updated current pose estimate to a flight management computer of the aircraft 131. The updated current pose estimate can be feedback to block 402 to update the current pose estimate. At block 409, the flight management computer can use the updated pose estimate in guidance on final approach in absence or supplemental to navigation data from the ALS and/or the instrument landing systems (ILS).

In FIG. 5, as shown at block 501, the method 500 includes obtaining a current pose estimate of the aircraft 131 relative to the airfield runway, the current pose estimate having a current altitude, bearing, and distance from the airfield runway. At block 502, the method includes determining, based on the current pose estimate of the aircraft, a plurality of proximate poses of the aircraft each having an adjusted altitude, adjusted bearing, and adjusted distance within a predetermined amount of the current altitude, bearing, and distance from the airfield runway.

At block 503, the method 500 includes generating, from airfield model data for the airfield, a plurality of images of the airfield runway from a plurality of expected points-of-view of the aircraft 131 corresponding to the plurality of proximate poses. At block 504, the method includes acquiring, from an imaging device on the aircraft approaching the airfield runway, a real-time image of the airfield runway.

At block 505, the method includes performing a comparison of the real-time image and the plurality of images to identify a best-match image from the plurality of images, based on a measure of mutual objects identified in the real-time image and the plurality of images, the best-match image being from a respective one of the plurality of expected points-of-view corresponding to a respective one of the plurality of proximate poses of the aircraft, the respective one of the plurality of proximate poses having a respective adjusted altitude, adjusted bearing, and adjusted distance from the airfield runway At block 506, the method 500 includes generating, based on the best-match image and the respective adjusted altitude, adjusted bearing, and adjusted distance from the airfield runway, an updated current pose estimate of the aircraft 131 having the respective adjusted altitude, adjusted bearing, and adjusted distance to the airfield runway. At block 507, the method includes outputting the updated current pose estimate to a flight control computer of the aircraft, for use in guidance of the aircraft on a final approach. For example, the updated current pose estimate can be utilized by the pilot or autopilot of the aircraft to perform successful landing. The method can be implemented multiple times by the aircraft support subsystem 101 at different points of time when the aircraft is approaching the airfield runway to generate more accurate updated current pose estimates.

According to example implementations of the present disclosure, the system 100 and its subsystems including the aircraft support subsystem 101, image capture device 111 and display device 121 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 6:
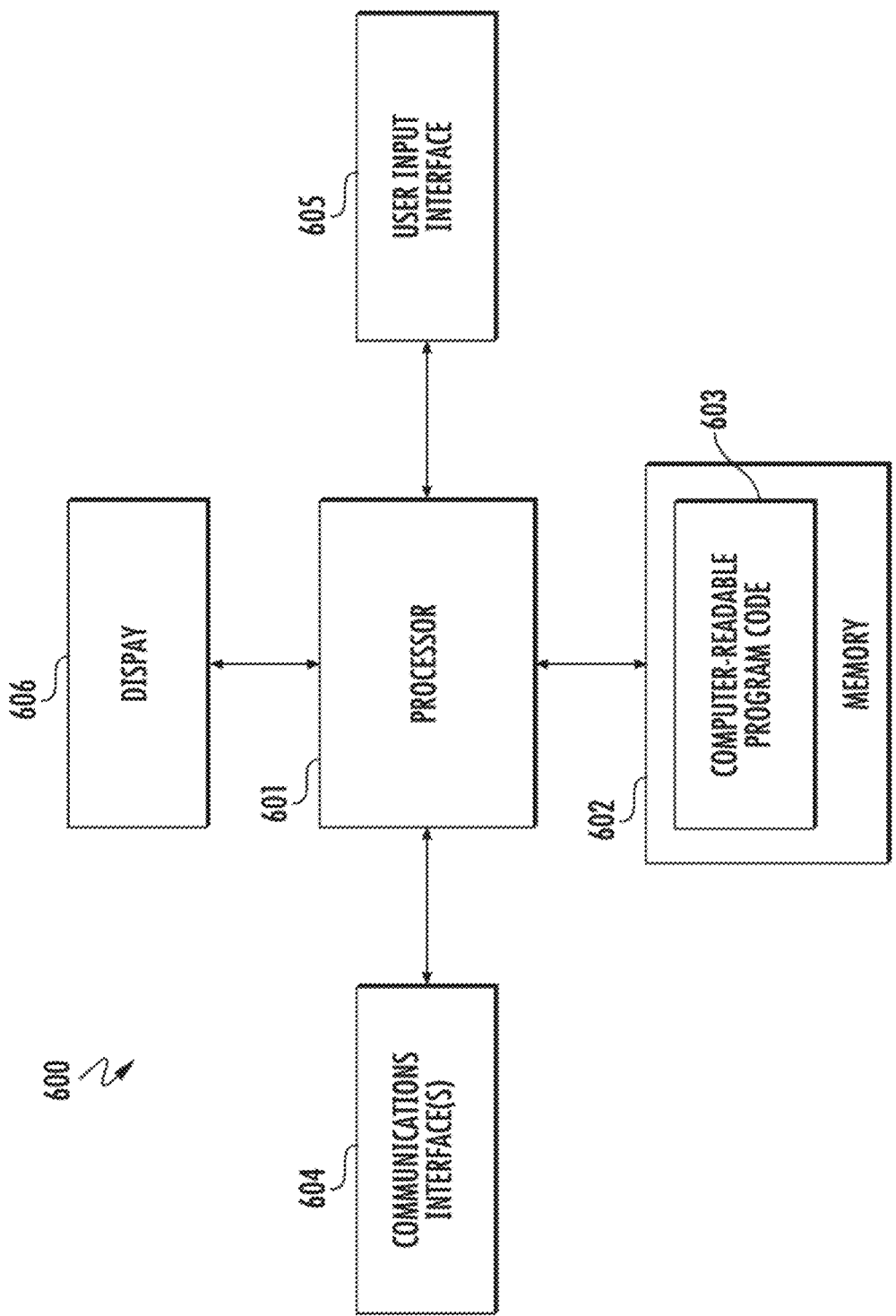
FIG. 6 illustrates an apparatus according to some example implementations.

FIG. 6 illustrates an apparatus 600 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 601 (e.g., processing circuitry) connected to a memory 602 (e.g., storage device). In some examples, the apparatus 600 implements the system 100.

The processor 601 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 602 (of the same or another apparatus).

The processor 601 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 602 is generally any piece of computer hardware that is capable of storing information such as, for example, data, computer programs (e.g., computer-readable program code 603) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 602, the processor 601 may also be connected to one or more interfaces for displaying, transmitting and/or receiving information. The interfaces may include a communications interface 604 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 606 and/or one or more user input interfaces 605 (e.g., input/output unit). The display 606 may correspond to the display device 121 in FIG. 1. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, keyboard or keypad, joystick, touch-sensitive surface (separate from or integrated into a touchscreen), biometric sensor or the like. The user input interfaces may include the image capture device 111 in FIG. 1, which may be an image or video capture device. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 601 and a computer-readable storage medium or memory 602 coupled to the processor, where the processor is configured to execute computer-readable program code 603 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting an aircraft approaching an airfield runway of an airfield, the apparatus comprising a processor and a memory storing executable instructions that, in response to execution by the processor, cause the apparatus to at least:

obtain a current pose estimate of the aircraft relative to the airfield runway, the current pose estimate having a current altitude, bearing, and distance from the airfield runway;

determine, based on the current pose estimate of the aircraft, a plurality of proximate poses of the aircraft each having an adjusted altitude, adjusted bearing, and adjusted distance within a predetermined amount of the current altitude, bearing, and distance from the airfield runway;

generate, from airfield model data for the airfield, a plurality of images of the airfield runway from a plurality of expected points-of-view of the aircraft corresponding to the plurality of proximate poses;

acquire, from an imaging device on the aircraft approaching the airfield runway, a real-time image of the airfield runway;

perform a comparison of the real-time image and the plurality of images to identify a best-match image from the plurality of images, based on a measure of mutual objects identified in the real-time image and the plurality of images, the best-match image being from a respective one of the plurality of expected points-of-view corresponding to a respective one of the plurality of proximate poses of the aircraft, the respective one of the plurality of proximate poses having a respective adjusted altitude, adjusted bearing, and adjusted distance from the airfield runway;

generate, based on the best-match image and the respective adjusted altitude, adjusted bearing, and adjusted distance from the airfield runway, an updated current pose estimate of the aircraft having the respective adjusted altitude, adjusted bearing, and adjusted distance to the airfield runway; and output the updated current pose estimate to a flight control computer of the aircraft, for use in guidance of the aircraft on a final approach.

2. The apparatus of claim 1, wherein the apparatus being caused to obtain the current pose estimate includes being caused to:

determine, via aircraft system data, an initial pose estimate of the aircraft relative to the airfield runway; and set the initial pose estimate as the current pose estimate.

3. The apparatus of claim 1, wherein the apparatus being caused to output the updated current pose estimate includes being caused to output the updated current pose estimate to the flight control computer of the aircraft, for use in guidance of the aircraft on the final approach without using instrument landing system navigation data associated with the airfield.

4. The apparatus of claim 1, wherein the plurality of proximate poses includes a number of proximate poses, and the apparatus being caused to determine the plurality of proximate poses includes being caused to reduce the number of proximate poses determined as the current distance from the airfield runway decreases.

5. The apparatus of claim 1, wherein the apparatus being caused to perform the comparison includes the apparatus being caused to perform the comparison of the real-time image and the plurality of images to identify one or more sections of the best-match image that include the mutual objects identified in the real-time image and the plurality of images.

6. The apparatus of claim 1, wherein the apparatus being caused to perform the comparison includes the apparatus being caused to determine a correlation between the real-time image and the plurality of images as the measure of mutual objects identified in the real-time image and the plurality of images.

7. The apparatus of claim 6, wherein the correlation between the real-time image and the best-match image indicates a level of similarity between the real-time image and the best-match image, and wherein the memory stores further executable instructions that, in response to execution by the processor, cause the apparatus to further produce an indicator indicating the level of similarity to a user.

8. The apparatus of claim 1, wherein the memory stores further executable instructions that, in response to execution by the processor, cause the apparatus to further validate instructions of an automatic landing system of the aircraft for the final approach using the updated current pose estimate.

9. A method for supporting an aircraft approaching an airfield runway of an airfield, the method comprising:
   obtaining a current pose estimate of the aircraft relative to the airfield runway, the current pose estimate having a current altitude, bearing, and distance from the airfield runway;
   determining, based on the current pose estimate of the aircraft, a plurality of proximate poses of the aircraft each having an adjusted altitude, adjusted bearing, and adjusted distance within a predetermined amount of the current altitude, bearing, and distance from the airfield runway;
   generating, from airfield model data for the airfield, a plurality of images of the airfield runway from a plurality of expected points-of-view of the aircraft corresponding to the plurality of proximate poses;
   acquiring, from an imaging device on the aircraft approaching the airfield runway, a real-time image of the airfield runway;
   performing a comparison of the real-time image and the plurality of images to identify a best-match image from the plurality of images, based on a measure of mutual objects identified in the real-time image and the plurality of images, the best-match image being from a respective one of the plurality of expected points-of-view corresponding to a respective one of the plurality of proximate poses of the aircraft, the respective one of the plurality of proximate poses having a respective adjusted altitude, adjusted bearing, and adjusted distance from the airfield runway;
   generating, based on the best-match image and the respective adjusted altitude, adjusted bearing, and adjusted distance from the airfield runway, an updated current pose estimate of the aircraft having the respective adjusted altitude, adjusted bearing, and adjusted distance to the airfield runway; and
   outputting the updated current pose estimate to a flight control computer of the aircraft, for use in guidance of the aircraft on a final approach.

10. The method of claim 9, wherein obtaining the current pose estimate comprises:
    determining, via aircraft system data, an initial pose estimate of the aircraft relative to the airfield runway; and
    setting the initial pose estimate as the current pose estimate.

11. The method of claim 9, wherein the updated current pose estimate is output to the flight control computer of the aircraft, for use in guidance of the aircraft on the final approach without using instrument landing system navigation data associated with the airfield.

12. The method of claim 9, wherein the plurality of proximate poses includes a number of proximate poses, and determining the plurality of proximate poses includes reducing the number of proximate poses determined as the current distance from the airfield runway decreases.

13. The method of claim 9, wherein performing the comparison includes performing the comparison of the real-time image and the plurality of images to identify one or more sections of the best-match image that include the mutual objects identified in the real-time image and the plurality of images.

14. The method of claim 9, wherein performing the comparison includes determining a correlation between the real-time image and the plurality of images as the measure of mutual objects identified in the real-time image and the plurality of images.

15. The method of claim 14, wherein the correlation between the real-time image and the best-match image indicates a level of similarity between the real-time image and the best-match image, and the method further comprising producing an indicator indicating the level of similarity to a user.

16. The method of claim 9, further comprising validating instructions of an automatic landing system of the aircraft for the final approach using the updated current pose estimate.

17. A computer-readable storage medium for supporting an aircraft approaching an airfield runway of an airfield, the computer-readable storage medium being non-transitory and having computer-readable program code stored therein that in response to execution by a processor, causes an apparatus to at least:
    obtain a current pose estimate of the aircraft relative to the airfield runway, the current pose estimate having a current altitude, bearing, and distance from the airfield runway;
    determine, based on the current pose estimate of the aircraft, a plurality of proximate poses of the aircraft each having an adjusted altitude, adjusted bearing, and adjusted distance within a predetermined amount of the current altitude, bearing, and distance from the airfield runway;
    generate, from airfield model data for the airfield, a plurality of images of the airfield runway from a plurality of expected points-of-view of the aircraft corresponding to the plurality of proximate poses;

acquire, from an imaging device on the aircraft approaching the airfield runway, a real-time image of the airfield runway;

perform a comparison of the real-time image and the plurality of images to identify a best-match image from the plurality of images, based on a measure of mutual objects identified in the real-time image and the plurality of images, the best-match image being from a respective one of the plurality of expected points-of-view corresponding to a respective one of the plurality of proximate poses of the aircraft, the respective one of the plurality of proximate poses having a respective adjusted altitude, adjusted bearing, and adjusted distance from the airfield runway;

generate, based on the best-match image and the respective adjusted altitude, adjusted bearing, and adjusted distance from the airfield runway, an updated current pose estimate of the aircraft having the respective adjusted altitude, adjusted bearing, and adjusted distance to the airfield runway; and output the updated current pose estimate to a flight control computer of the aircraft, for use in guidance of the aircraft on a final approach.

18. The computer-readable storage medium of claim 17, wherein the apparatus being caused to obtain the current pose estimate includes being caused to:

determine, via aircraft system data, an initial pose estimate of the aircraft relative to the airfield runway; and set the initial pose estimate as the current pose estimate.

19. The computer-readable storage medium of claim 17, wherein the apparatus being caused to output the updated current pose estimate includes being caused to output the updated current pose estimate to the flight control computer of the aircraft, for use in guidance of the aircraft on the final approach without using instrument landing system navigation data associated with the airfield.

20. The computer-readable storage medium of claim 17, wherein the plurality of proximate poses includes a number of proximate poses, and the apparatus being caused to determine the plurality of proximate poses includes being caused to reduce the number of proximate poses determined as the current distance from the airfield runway decreases.

21. The computer-readable storage medium of claim 17, wherein the apparatus being caused to perform the comparison includes the apparatus being caused to perform the comparison of the real-time image and the plurality of images to identify one or more sections of the best-match image that include the mutual objects identified in the real-time image and the plurality of images.

22. The computer-readable storage medium of claim 17, wherein the apparatus being caused to perform the comparison includes the apparatus being caused to determine a correlation between the real-time image and the plurality of images as the measure of mutual objects identified in the real-time image and the plurality of images.

23. The computer-readable storage medium of claim 22, wherein the correlation between the real-time image and the best-match image indicates a level of similarity between the real-time image and the best-match image, and wherein the computer-readable storage medium has further computer-readable program code stored therein that in response to execution by the processor, causes the apparatus to further produce an indicator indicating the level of similarity to a user.

24. The computer-readable storage medium of claim 17, having further computer-readable program code stored therein that in response to execution by the processor, causes the apparatus to further validate instructions of an automatic landing system of the aircraft for the final approach using the updated current pose estimate.

* * * * *